US012270250B2

(12) United States Patent
Knable et al.

(10) Patent No.: US 12,270,250 B2
(45) Date of Patent: Apr. 8, 2025

(54) FORTIFIED ROLL-UP BARRIER

(71) Applicant: Overhead Door Corporation, Lewisville, TX (US)

(72) Inventors: Bradley C. Knable, Mcveytown, PA (US); David J. Horn, Loysville, PA (US); Victor P. Santos Luzon, Lewistown, PA (US)

(73) Assignee: Overhead Door Corporation, Lewisville, TX (US)

( * ) Notice: Subject to any disclaimer, the term of this patent is extended or adjusted under 35 U.S.C. 154(b) by 374 days.

(21) Appl. No.: 17/696,488

(22) Filed: Mar. 16, 2022

(65) Prior Publication Data

US 2023/0295982 A1 Sep. 21, 2023

(51) Int. Cl.
*E06B 9/15* (2006.01)
*E06B 9/06* (2006.01)
*E06B 9/17* (2006.01)

(52) U.S. Cl.
CPC .............. *E06B 9/15* (2013.01); *E06B 9/0638* (2013.01); *E06B 9/0646* (2013.01); *E06B 9/17007* (2013.01); *E06B 2009/0684* (2013.01); *E06B 2009/1516* (2013.01)

(58) Field of Classification Search
CPC ..... E06B 9/11; E06B 9/15; E06B 9/17; E06B 9/58; E06B 9/0638; E06B 9/0646; E06B 9/0684; E06B 2009/1505; E06B 2009/1516; E06B 2009/1577; E06B 2009/1583; E06B 2009/1594; E06B 2009/17007; E06B 2009/17069
See application file for complete search history.

(56) References Cited

U.S. PATENT DOCUMENTS 978,770 A * 12/1910 McCloud .................. E06B 9/24 160/231.1
2,208,039 A * 7/1940 Mills .......................... E06B 9/15 160/133

(Continued)

FOREIGN PATENT DOCUMENTS

EP 0152881 A2 * 8/1985
WO WO-2005106153 A1 * 11/2005 .............. B41M 3/00

OTHER PUBLICATIONS

Insulgard Security Products, FG Series Fiberglass Opaque, DS133, 3 pages, www.insulgard.com.

(Continued)

*Primary Examiner* — Johnnie A. Shablack
(74) *Attorney, Agent, or Firm* — Haynes and Boone, LLP

(57) ABSTRACT

A barrier system includes a roll-up barrier comprising a plurality of slats hingedly connected, a guide system, and a drive system. Each slat of the plurality of slats includes a central portion having a first thickness, a top portion, and a bottom portion. At least one of the top portion or the bottom portion having a second thickness less than the first thickness. The top portion of each slat overlaps the bottom portion of an adjacent slat forming an overlapping region having the first thickness when the barrier is in a closed configuration. The guide system is configured to guide movement of the roll-up barrier. The drive system configured to transition the roll-up barrier between open and closed configurations along the guide system.

27 Claims, 9 Drawing Sheets

(56) References Cited

U.S. PATENT DOCUMENTS

| | | | | | |
|---|---|---|---|---|---|
| 2,934,139 | A * | 4/1960 | Wardlaw | E06B 9/08 | 160/310 |
| 4,126,173 | A * | 11/1978 | Theuerkauff | E06B 9/08 | 160/231.1 |
| 5,365,990 | A * | 11/1994 | Ueda | E06B 9/15 | 160/133 |
| 5,394,924 | A * | 3/1995 | Rejc | E06B 3/485 | 160/40 |
| 5,419,386 | A * | 5/1995 | Magro | E06B 9/15 | D25/48.8 |
| 5,482,103 | A * | 1/1996 | Burgess | A62C 2/242 | 160/9 |
| 5,484,007 | A * | 1/1996 | Rejc | E06B 9/0638 | 160/133 |
| 6,148,895 | A * | 11/2000 | Biggers | E06B 9/0638 | 160/183 |
| 6,715,529 | B2 * | 4/2004 | Farooq | E06B 9/581 | 160/133 |
| 8,549,803 | B1 * | 10/2013 | Retzloff | E06B 1/52 | 52/204.1 |
| 8,899,297 | B2 * | 12/2014 | Mazej | E06B 9/174 | 160/310 |
| 9,097,062 | B2 * | 8/2015 | Letonje | E06B 9/0638 | |
| 9,746,289 | B2 * | 8/2017 | Hahn | F41H 5/06 | |
| 9,797,153 | B2 * | 10/2017 | Baggiero, II | E04H 9/16 | |
| 10,012,015 | B2 * | 7/2018 | Rejc | E05D 13/1238 | |
| 10,746,509 | B2 * | 8/2020 | Deering | E06B 3/822 | |
| 10,801,815 | B2 * | 10/2020 | Adrain | F41H 5/26 | |
| 10,829,989 | B2 * | 11/2020 | Rejc | E05D 15/242 | |
| 11,162,301 | B2 * | 11/2021 | Ouyang | E06B 9/0638 | |
| 11,230,880 | B2 * | 1/2022 | Magro | E06B 9/165 | |
| 11,512,523 | B2 * | 11/2022 | Dawdy | E06B 9/17046 | |
| 11,543,215 | B2 * | 1/2023 | Mazej | E06B 5/10 | |
| 11,561,070 | B2 * | 1/2023 | Adrain | E06B 9/386 | |
| 11,814,896 | B1 * | 11/2023 | Velazquez | E06B 9/04 | |
| 2003/0173040 | A1 * | 9/2003 | Court | E06B 9/58 | 160/264 |
| 2004/0206462 | A1 * | 10/2004 | Fitzgerald | E06B 9/13 | 160/231.1 |
| 2007/0193701 | A1 * | 8/2007 | Petrick | E06B 9/15 | 160/133 |
| 2008/0210386 | A1 * | 9/2008 | Neuhaus | E06B 9/0638 | 160/133 |
| 2009/0071082 | A1 * | 3/2009 | Van Der Kort | E06B 9/11 | 52/741.3 |
| 2009/0235602 | A1 * | 9/2009 | Ceccofiglio | E06B 9/581 | 160/133 |
| 2016/0090777 | A1 * | 3/2016 | Brunton | E06B 3/38 | 160/133 |
| 2016/0222720 | A1 | 8/2016 | Tamberino et al. | | |
| 2019/0071923 | A1 | 3/2019 | Ouyang et al. | | |
| 2021/0131178 | A1 * | 5/2021 | Fischer | E06B 9/171 | |
| 2022/0390211 | A1 * | 12/2022 | Adrain | E06B 9/382 | |
| 2023/0184518 | A1 * | 6/2023 | Glick | F41H 5/24 | 89/36.01 |
| 2023/0295982 | A1 * | 9/2023 | Knable | E06B 9/0646 | 160/133 |
| 2024/0052692 | A1 * | 2/2024 | Vanbever | E06B 9/17061 | |
| 2024/0125170 | A1 * | 4/2024 | Glick | E06B 9/15 | |
| 2024/0159103 | A1 * | 5/2024 | Flores | G06V 20/52 | |

OTHER PUBLICATIONS

Alro Plastics, Acculam Matrix HT G14 Technical Data Sheet, 1 page, alroplastics.com.

Canadian Intellectual Property Office, Examination Report for Canadian Application No. 3,192,893, dated Jul. 23, 2024, 4 pages.

* cited by examiner

FORTIFIED ROLL-UP BARRIER

TECHNICAL FIELD

This disclosure is generally directed to a roll-up barrier and, in some particular embodiments, to a fortified roll-up barrier which is resistant to forced entry and projectiles.

BACKGROUND

Roll-up barriers may be constructed from rigid sections or slats which are hinged together to form the barrier when in a closed position and to spool into a rolled configuration when the barrier is opened. In certain applications, it may be desirable for a roll-up barrier to be reinforced, armored, or otherwise strengthened to provide enhanced security to building occupants and property.

Accordingly, a need exists for a roll-up barrier that addresses one or more shortcomings of conventional roll-up barriers.

SUMMARY

The present disclosure is directed to a roll-up barrier system that may address one or more of the challenges found in conventional roll-up barriers. Some implementations may be bullet proof, bullet resistant, or otherwise armored to improve the safety and security of building occupants and property.

According to some examples, the present disclosure is directed to a barrier system including a roll-up barrier, a guide system, and a drive system. The roll-up barrier includes a plurality of slats hingedly connected together. The number of slats may vary depending on a particular application but in some examples include approximately 25 slats. Each slat of the plurality of slats includes a central portion having a first thickness, a top portion having a second thickness less than the first thickness, and a bottom portion having a third thickness less than the first thickness. The top portion of each slat overlaps the bottom portion of an adjacent slat forming an overlapping region having the first thickness when the barrier is in a closed configuration. The guide system is configured to guide movement of the roll-up barrier. The drive system is configured to transition the roll-up barrier between open and closed configurations along the guide system.

In some examples, a roll-up barrier may include a plurality of roller assemblies. Each roller assembly may be secured to one of the plurality of slats. A guide system may include opposing tracks configured to receive a plurality of rollers of the plurality of roller assemblies to guide the slats as the barrier transitions between the closed configuration and the open configuration. A guide system may further include a spiral bracket secured to each opposing track. Each spiral bracket may be configured to guide the plurality of slats into a spiral formation when in the open configuration.

In some example, a barrier system may include side columns shrouding at least a portion of the plurality of roller assemblies and the tracks. The side columns may be formed of a first material configured to splay a projectile. A barrier system may include at least one protective panel disposed within at least one of the side columns. A protective panel may be formed of a second material configured to arrest a projectile. The first material may include steel and the second material may include at least one of fiberglass, aramid, or carbon. Each side column may form a slot configured to receive an end portion of each slat of the plurality of slats. A width of the slot may correspond to a thickness of the plurality of slats.

According to some examples, a slat for a roll-up barrier may include a core formed of a first material configured to arrest a projectile and a front covering formed of a second material different than the first material and configured to splay the projectile.

In some examples, a slat may include a rear covering formed of a third material configured to trap debris within the core. The third material may be the same as the second material. The second material and the third material may comprise steel. The first material may comprise woven compressed fiberglass.

In some examples, a top edge of a slat may be angled with respect to a front surface of the slat in a first direction and a bottom edge of the slat may be angled with respect to the front surface in the first direction. A top edge of a slat may include a rabbet formed into a front surface or a rear surface of the slat and a bottom edge of the slat may include a rabbet formed into the other of the front surface or the rear surface.

According to some examples, a barrier may include a plurality of slats hingedly connected. Each slat may include a central portion having a first thickness, a top portion having a second thickness less than the first thickness, and a bottom portion having a third thickness less than the first thickness. The top portion of each slat may overlap the bottom portion of an adjacent slat forming an overlapping region having the first thickness when the barrier is in a closed configuration.

In some examples, each slat may include a core formed of a first material configured to arrest a projectile and a front covering formed of a second material different than the first material and configured to splay the projectile. The front covering may extend across the central portion and one of the top portion or the bottom portion. Each slat may include a rear covering formed of the second material. The rear covering may extend across the central portion and the other of the top portion or the bottom portion. The top portion of each slat may include a surface angled relative to a front surface of the slat in a first direction and a bottom surface angled relative to the front surface in the first direction. The top portion of each slat may include a rabbet formed into a front surface or a rear surface and the bottom portion of each slat may include a rabbet formed into the other of the front surface or the rear surface.

According to some examples, a barrier system includes a roll-up barrier, a guide system, and a drive system. The roll-up barrier may include a plurality of adjacent slats. Each slat of the plurality of slats having a first thickness and comprising a front surface, a rear surface, an upper edge connecting the front surface and the rear surface, and a lower edge connecting the front surface and the rear surface. At least a portion of both the upper edge and the lower edge may have a non-horizontal profile when the barrier is in a closed configuration, such that the upper edge of each slat vertically overlaps the lower edge of an adjacent slat to form an overlapping region having the first thickness when the barrier is in the closed configuration. The guide system may be configured to guide movement of the roll-up barrier. The drive system may be configured to transition the roll-up barrier between open and closed configurations along the guide system.

In some examples, the non-horizontal profile of the upper edge may be shaped to matingly engage with the non-horizontal profile of the lower edge.

According to some examples, a roll-up barrier includes a plurality of slats hingedly connected together and forming joints between adjacent slats. The roll-up barrier may have a closed configuration in which the plurality of slats collectively form a vertical panel and an open configuration in which the plurality of slats assume a rolled formation. The joints are configured to arrest, in a closed configuration of the barrier, a projectile meeting the criteria of UL 752 Level 8.

In some examples, each joint may include a vertically overlapping region including a top portion of a first slat and a bottom portion of a second slat. The vertically central region of each slat of the plurality of slats may include one or more projectile resistant materials and each joint comprises the one or more projectile resistant materials in substantially equal proportion to the vertically centrally region of each slat as measured in a cross-section perpendicular to a front surface of the barrier. Each joint may include a seam extending from a front surface of the barrier to a rear surface of the barrier. At least a portion of the seam may be non-perpendicular to the front surface of the barrier.

It is to be understood that both the foregoing general description and the following drawings and detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following. One or more features of any embodiment or aspect may be combinable with one or more features of other embodiment or aspect.

BRIEF DESCRIPTION OF THE DRAWINGS

The accompanying drawings illustrate implementations of the systems, devices, and methods disclosed herein and together with the description, serve to explain the principles of the present disclosure.

Figure 1A:
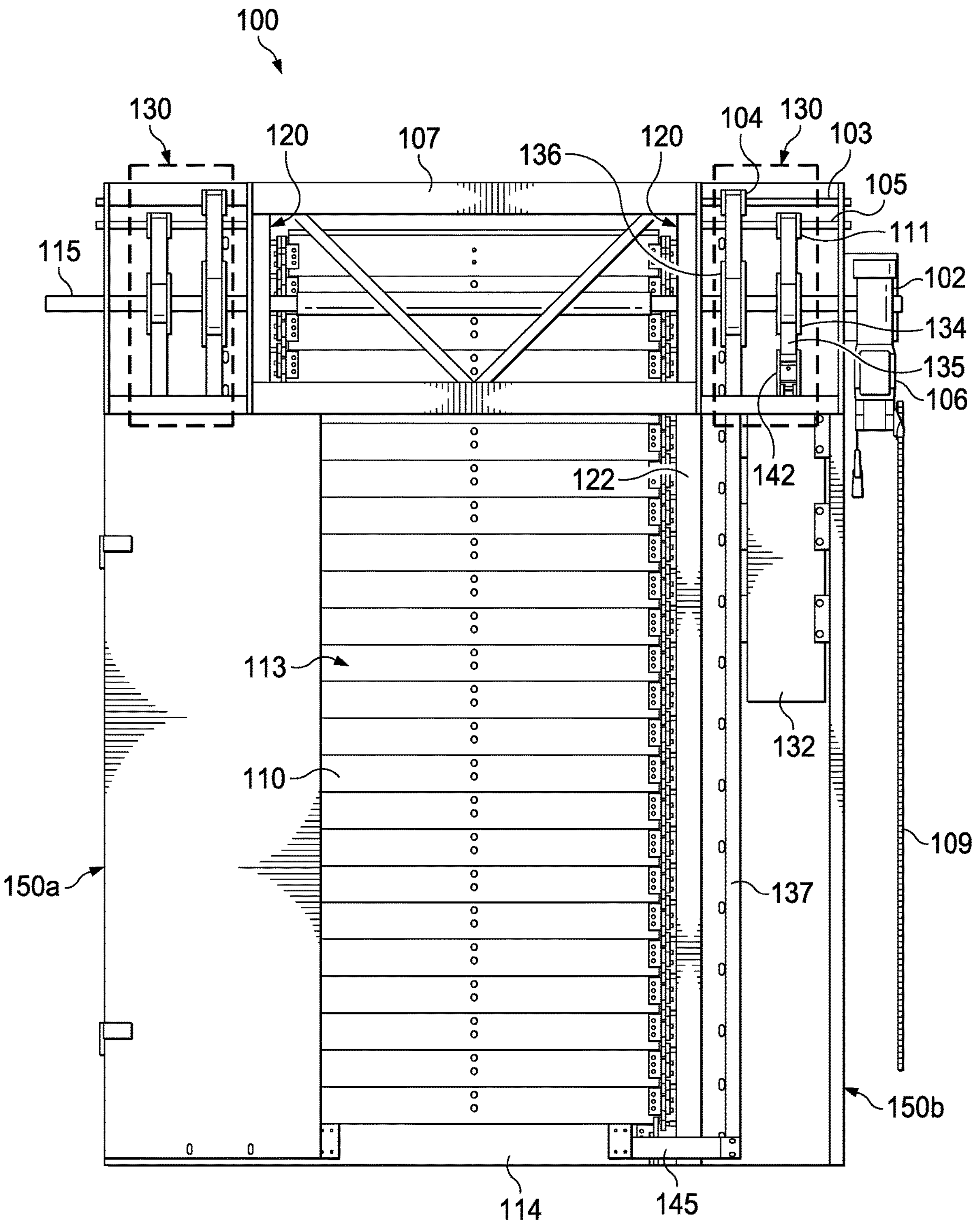
FIG. 1A is a rear view of an example of a barrier system according to the present disclosure in a closed configuration.

These Figures will be better understood by reference to the following Detailed Description.

DETAILED DESCRIPTION

For the purpose of promoting an understanding of the principles of the present disclosure, reference will now be made to the implementations illustrated in the drawings and specific language will be used to describe them. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In addition, this disclosure describes some elements or features in detail with respect to one or more example implementations or figures although those same elements or features may appear in other example implementations or figures without such a high level of detail. It is fully contemplated that the features, components, and/or steps described with respect to one or more example implementations or figures may be combined with the features, components, and/or steps described with respect to other example implementations or figures of the present disclosure. For simplicity, in some instances the same or similar reference numbers are used throughout the drawings to refer to the same or like parts.

The present disclosure is directed to a roll-up barrier system with a barrier constructed from rigid slats which is resistant to high-speed projectiles and forced entry and which prevents or traps debris generated by impact from a projectile. The barrier, side columns, and/or other elements of the barrier system may be fortified, reinforced, armored, or otherwise strengthened to provide enhanced security to building occupants and property. Elements which are susceptible to damage during forced entry may be concealed within side columns and shielded from access. Joints formed between adjacent slats may be constructed to provide protective capabilities similar to the bodies of the slats themselves.

Figure 1B:
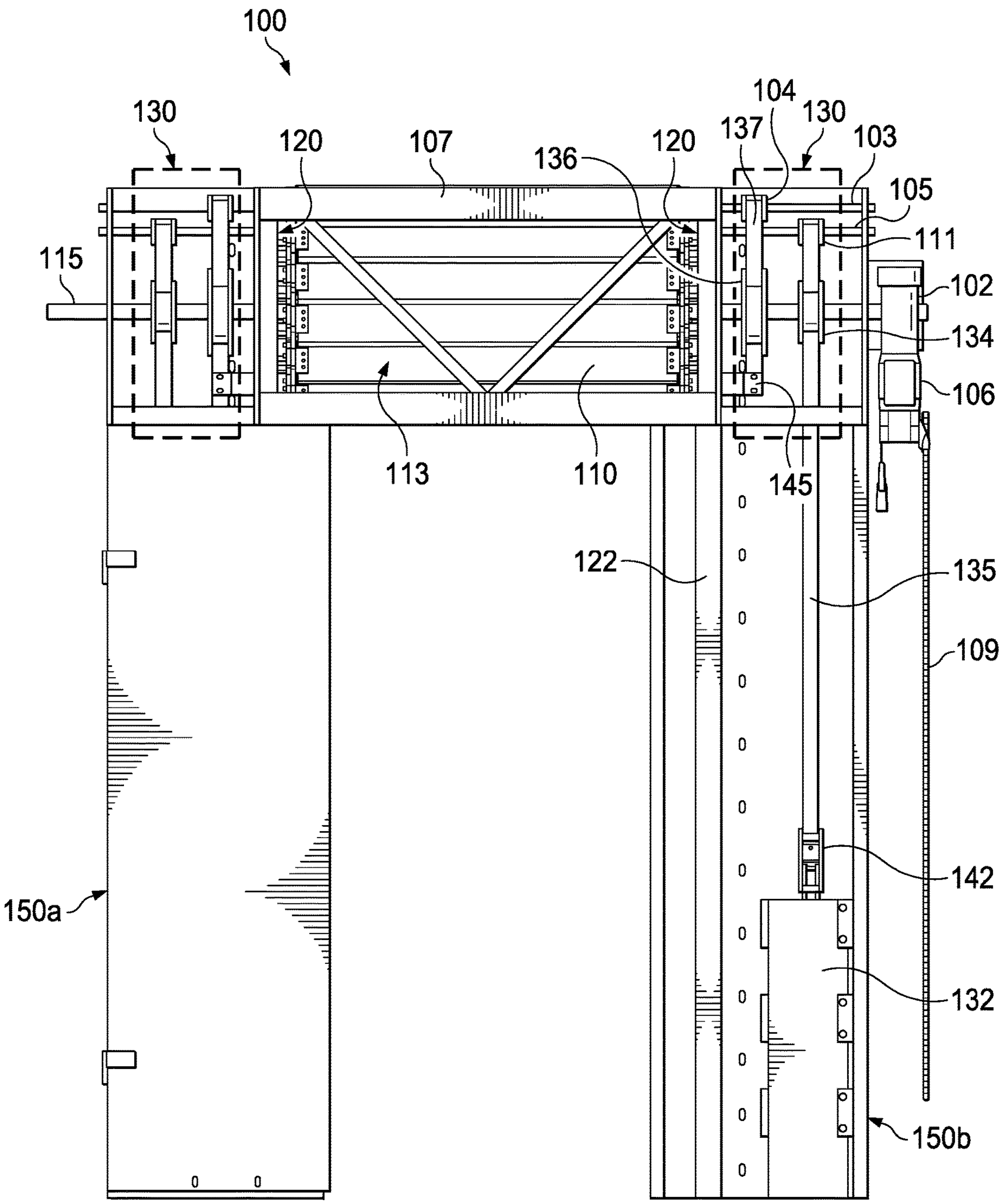
FIG. 1B is a rear view of the example of FIG. 1A an open configuration.
Figure 1C:
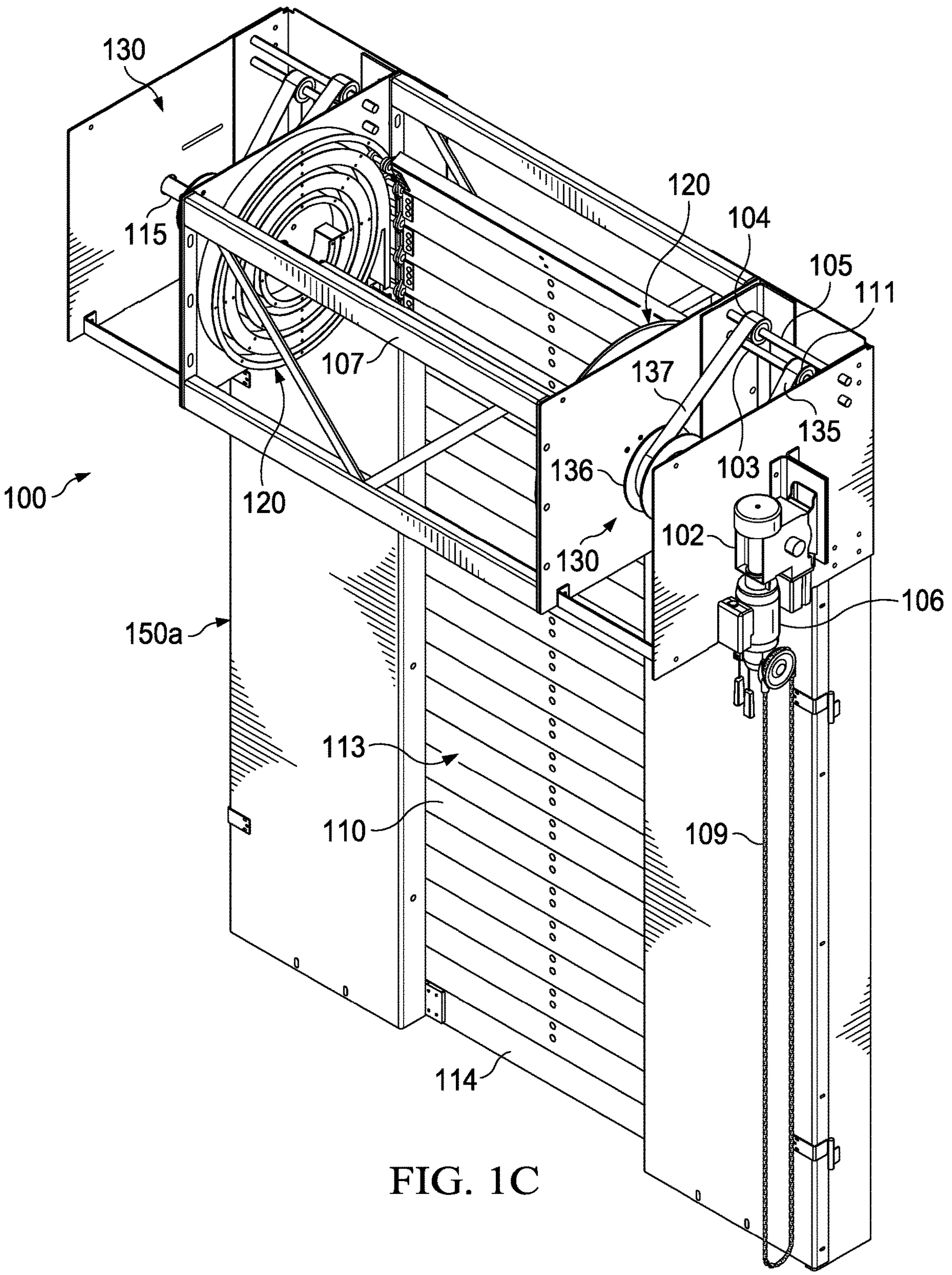
FIG. 1C is a perspective view of the example of FIG. 1A.

FIG. 1A is a rear elevational view of a barrier system 100 in a closed configuration, with some components removed to avoid obscuring parts of the disclosure. FIG. 1B is rear elevational view of the barrier system 100 in an open configuration. FIG. 1C is a perspective view of the barrier system 100. In the illustrated example, the barrier 113 is a roll-up door which may be a high-speed roll-up door. However, it should be appreciated that the principles of this disclosure may be similarly applied to other types of barriers such as gates and windows and this disclosure is not limited to high-speed roll-up doors.

In operation, the barrier 113 is driven between the open and closed position via a drive system 102. According to some embodiments, the drive system 102 includes a motor 106 for rotating the drive shaft 115, which as explained in greater detail below, operates to position the barrier 113 between the open and closed positions. It should be understood, however, that drive system 102, in addition to, or in lieu of a motor, can include a manually driven chain drive system 109 or other applicable systems for positioning the barrier 113 between the open and closed positions. According to some embodiments, the drive system 102 may be connected to a controller. The controller may serve as an interface for a user to command and monitor the operation of the barrier system 100. For example, the controller may include a monitor display, a touch screen, a keyboard, a touch pad, a mouse, or other input and output devices for a user to control, adjust, or program the operation of the barrier system 100.

A guide system may aid in guiding the barrier 113 as it is moved. The guide system includes a pair of spiral brackets 120 and vertical tracks 122 to guide a plurality of slats 110 forming the barrier 113 movable between a closed position, to prevent access through a passageway, and an open position, to facilitate access through the passageway. The spiral brackets 120 may be mounted to or within a frame 107 disposed near the top of the barrier system 100 and the vertical tracks 122 may be secured to the spiral brackets 120.

Each of the slats 110 includes a roller assembly at each respective end as discussed in more detail below. Each roller assembly includes a roller disposed and movable within the vertical tracks 122 and the spiral brackets 120. The vertical tracks 122 are positioned along the side columns 150*a*, 150*b* on either side of the barrier 113 and the spiral brackets 120 are aligned in a position generally above the passageway blocked by the barrier 113. In the example shown, the side column 150*a* is shown with a panel cover in place, while the side column 150*b* is shown with a panel cover removed for visualization of inner components and operation. In some implementations, the same components shown at side column 150*b* are also in the side column 150*a*. When the barrier 113 is in the open position as shown in FIG. 1B, the slats 110 are rolled into and are otherwise supported by the spiral brackets 120. As explained in greater detail below, each spiral bracket 120 includes a spiral track which guides and otherwise stores the slats 110 in a stored position as the as the barrier 113 is moved toward the open position.

As the barrier 113 is moved from the closed position to the open position, a bottom slat 114 is driven upward and balanced by a dual belt counterbalancing system 130. In the example illustrated, the counterbalancing system 130 includes a counterbalance belt 135 and a drive belt 137 and is positioned on each side of the barrier 113. However, it should be understood that the counterbalancing system 130 may be otherwise configured. For example, the counterbalancing system 130 may be positioned only on a single side of the barrier 113. As illustrated, the counterbalancing system 130 engages the bottom slat 114 via a coupling member 145 such that, as explained in greater detail below, the drive belt 137 pulls and otherwise lifts the bottom slat 114 upward toward the spiral brackets 120. The counterbalance belt 135 counterbalances the barrier 113 during movement thereof.

The counterbalancing system 130 includes a common drive shaft 115, a first reel or drive pulley 136 in which the drive belt 137 is wound thereon to lift or otherwise raise the bottom slat 114 and, in turn, the barrier 113, and a second reel or pulley 134 in which the counterbalance belt 135 is wound thereon to apply a counter balancing torque to the drive shaft 115 in a direction opposite the weight of the barrier 113. The counterbalance belt 135 connects a counterbalance weight 132 to the second reel 134. The second reel 134 is rotatably connected with the first reel 136 via the drive shaft 115. The drive belt 137 extends about a guide reel 104 on a first support shaft 103 and the counterbalance belt 135 extends about a guide reel 111 on a second support shaft 105.

A ratchet mechanism 142 connects the counterbalance belt 135 with the weight 132. In use, the ratchet mechanism 142 enables the counterbalance belt 135, and the length thereof, to be adjusted. Similarly, a ratchet mechanism (not shown) may connect the drive belt 137 with the coupling member 145 for adjusting the length of the drive belt 137.

Figure 2:
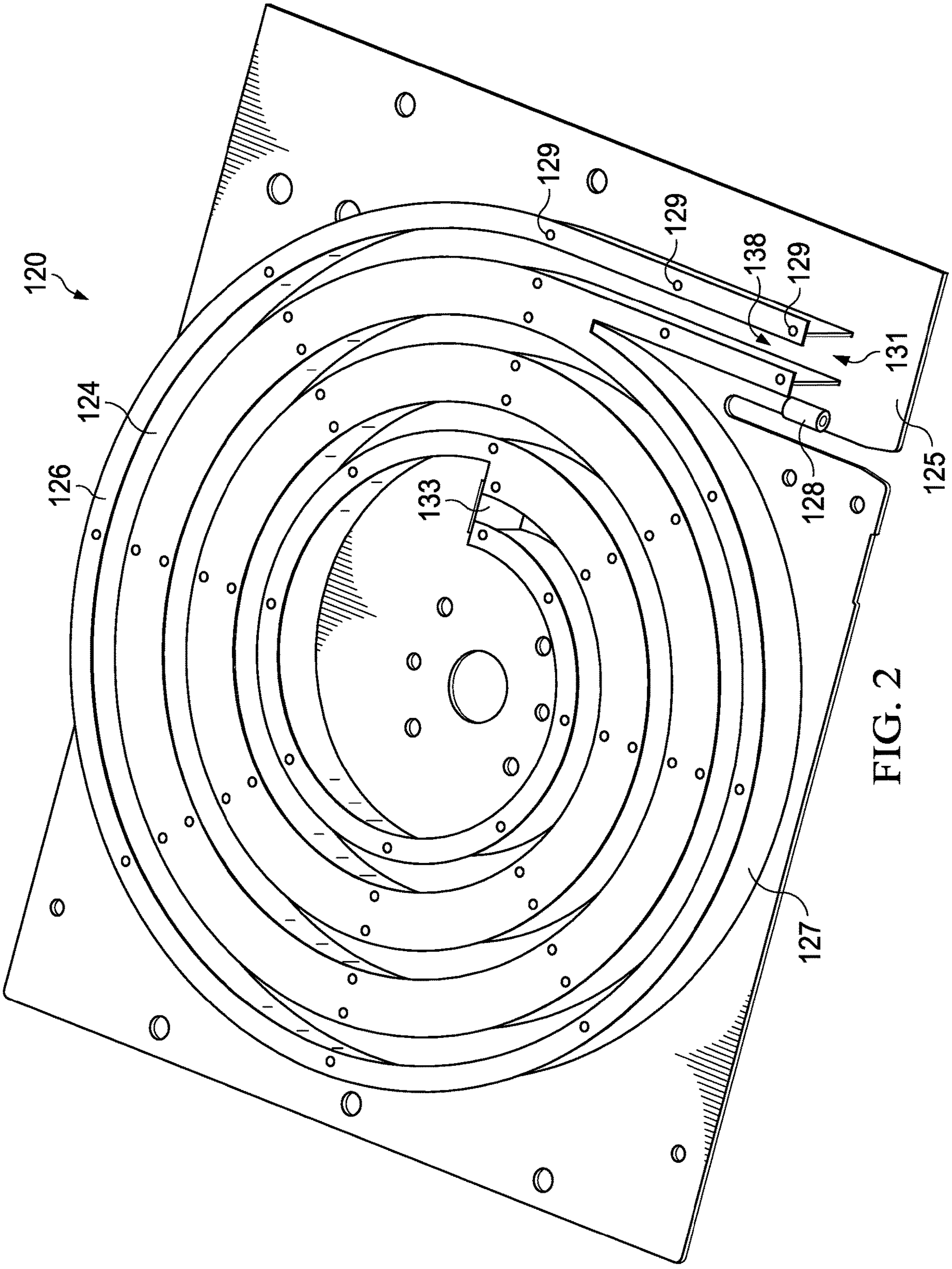
FIG. 2 is a perspective view of an example of a spiral bracket which may be used in the system of FIG. 1A.

FIG. 2 is a perspective view of an example of a spiral bracket 120 of FIG. 1A-1C formed having a back plate 125, a cover plate 126 spaced apart from the back plate 125 by a spiraling strip member 127 and forming a spiral track 124. It should be understood that the spiral brackets 120 on both sides of the barrier 113 have a similar configuration and thus for purposes of simplicity only one spiral bracket 120 will be discussed. In the embodiment illustrated in FIG. 2, the spiral track 124 is formed by the spiraling strip member 127, which extends between the back plate 125 and the cover plate 126. The spiral track 124 includes an entranceway 131 and spirals around and ultimately terminates at a terminal end 133 and is sized to receive the rollers attached to the slats 110 therein. In operation, the spiral track 124 guides the rollers as they enter the entranceway 131 during operation. According to some embodiments, the back plate 125, the metal strip 127, and the cover plate 126 provide a rectangular cross sectional channel for the rollers, with an opening 138 formed in the cover plate 126 to receive the shafts extending between the slats and the rollers. In some embodiments, the cover plate 126 is welded onto the metal strip 127 via a number of through weld holes 129. The spiral track 124 is formed having a curvature so that as the slats 110 move therein, the respective slats 110 remain spaced apart to avoid contact and damage thereto. In some instances, the spiral bracket 120 further includes an alignment structure 128 for aligning with the vertical track 122. According to some embodiments, the alignment structure 128 includes, for example, a cylinder, a cube, or other solid structures, welded directly onto the back plate 125 and provides a through hole for a corresponding alignment pin. The vertical track 122 includes a matching coupling structure that includes a second through hole for the alignment pin to go through. During installation, the alignment holes on the respective spiral bracket 120 and the vertical track 122 are generally aligned and an alignment pin is inserted therethrough. Additional description of a roll-up door including spiral brackets is provided in U.S. Pat. App. Pub. No. 2019/0071923 disclosing "Roll-Up Door with Spiral Brackets" which is incorporated by reference herein in its entirety.

Figure 3A:
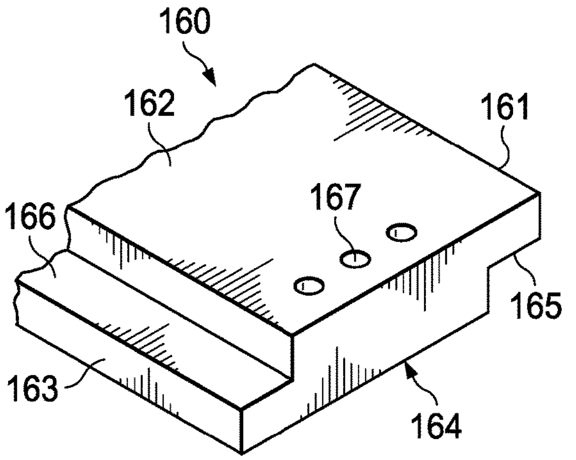
FIGS. 3A and 3B are perspective views of examples of slat cores which may be used in slats forming a barrier according to the present disclosure.
Figure 3B:
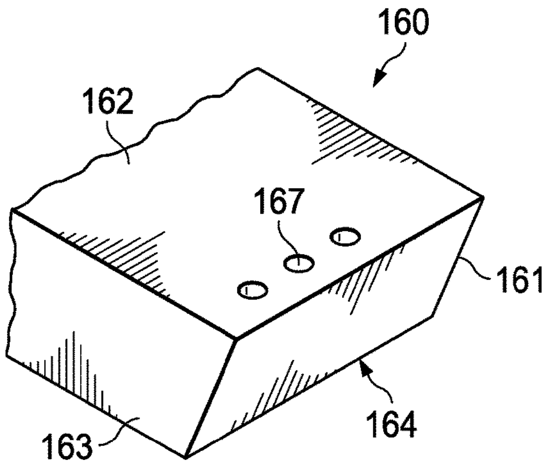
Figure 4A:
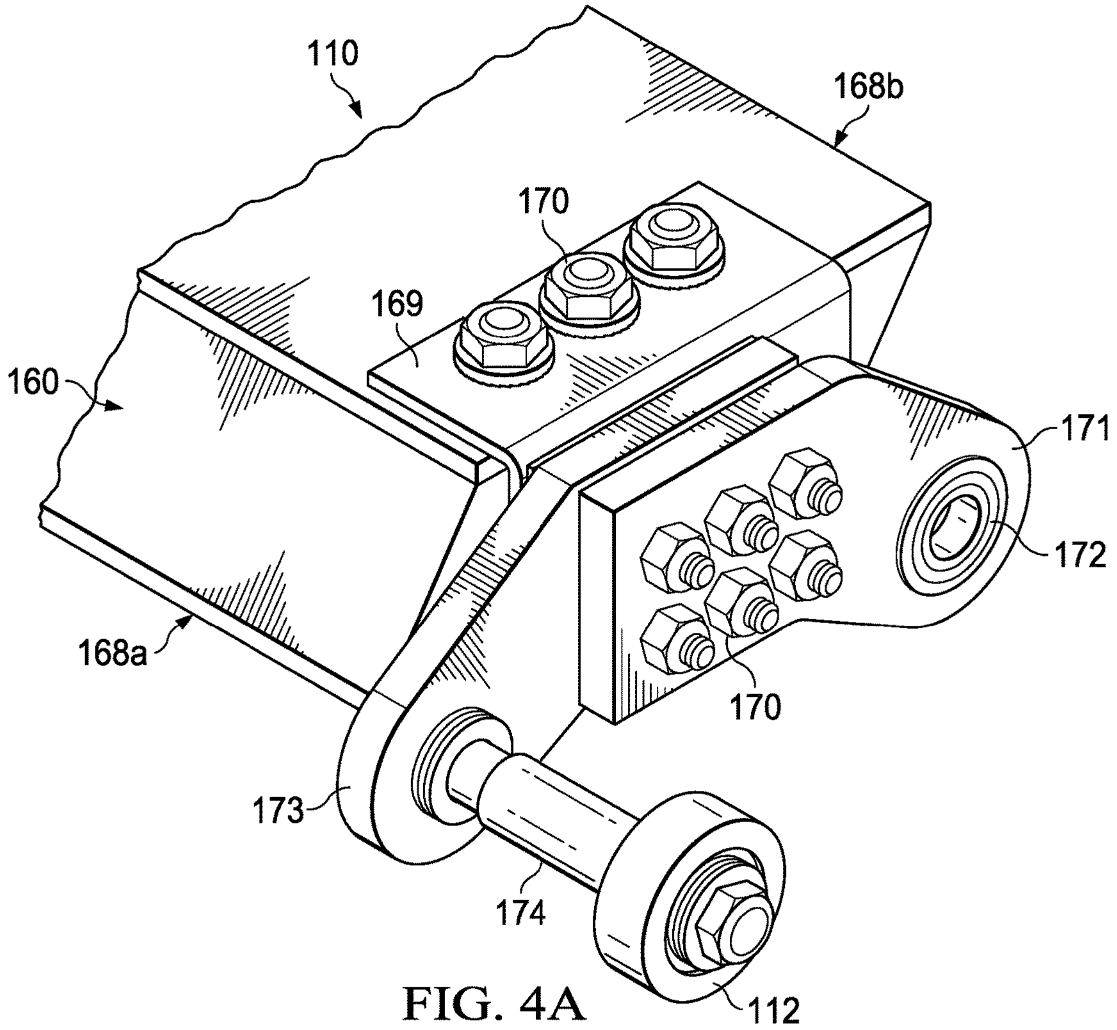
FIG. 4A is a perspective view of an example of a slat according to the present disclosure.

Turning now to FIGS. 3A, 3B, and 4, examples of a portion of the slats 110 are illustrated. In some implementations described herein, the slats 110 include a front covering, a rear covering (shown in FIG. 4), and a core 160 disposed between the front covering and the rear covering. FIG. 3A is a front perspective view of an end portion of a core as may be used in a slat 110 and FIG. 3B is a front perspective view of an end portion of another core as may be used in a slat 110 of the barrier 113. In FIG. 3A, the core 160 includes a top edge 161, a front side 162, a bottom edge 163, and a rear side 164. The top edge 161 includes a rear rabbet 165 and the bottom edge 163 includes a front rabbet 166. The rear rabbet 165 is formed as a notch or recess extending inward from the rear side 164 and the top of the core 160 and the front rabbet 166 is be formed as a notch or recess extending inward from the front side 162 and bottom of the core 160. Each rabbet 165, 166 may extend halfway through the thickness of the core 160. Although the rabbets 165 and 166 are shown as being defined by two planar surfaces intersecting at a right angle, it will be appreciated that the rabbets may have curved surfaces or may intersect at a greater or smaller angle. Additionally, the rear rabbet 165 may alternatively be positioned at the bottom edge 163 and the front rabbet 166 may be positioned at the top edge 161. Also, the rabbets 165, 166 may extend more or less than halfway through the thickness of the core 160.

When a barrier 113 formed of slats having the core 160 of FIG. 3A is in the open configuration, adjacent slats 110 may be arranged at different angles with respect to one another due to their hinged connection to one another and the barrier 113 being rolled up. However, as the barrier 113 is moved toward the closed configuration, the slats 110 are unwound and guided by the vertical tracks 122 into a linear arrangement. In the closed configuration, the slats 110 are aligned and adjacent slats 110 form a shiplap arrangement in which a top portion of the core 160 near the top edge 161 of one slat 110 nests into the rabbet 166 formed in the bottom portion near the bottom edge 163 of a first adjacent slat and the bottom portion near the bottom edge 163 nests into the rabbet 165 formed in the top portion of a second adjacent slat opposite the first adjacent slat. In this arrangement, the total thickness of material in an overlapping region of the joints formed between adjacent slats may be substantially equal to the thickness of the slats in their central portion. A plurality of holes 167 may extend through the central portion to receive fasteners as described below.

In FIG. 3B, the core 160 includes a top edge 161, a front side 162, a bottom edge 163, and a rear side 164. The top edge 161 connects the front side 162 and the rear side 164 and is formed as a surface angled with respect to the front side 162 and the rear side 164 and the bottom edge 163 connects the front side 162 and the rear side 164 and is formed as a surface with substantially the same angle, to thereby provide a mating profile. Although illustrated with the top edge 161 and bottom edge 163 being angled downward from the front side 162 to the rear side 164, it will be appreciated that these edges may be angled upward from the front side 162 to the rear side 164.

When a barrier 113 formed using slats having the core 160 of FIG. 3B is in the open configuration, adjacent slats 110 may be arranged at different angles with respect to one another due to their hinged connection to one another and the barrier 113 being rolled up. However, as the barrier 113 is moved toward the closed configuration, the slats 110 are unwound and guided by the vertical tracks 122 into a linear arrangement. In the closed configuration, the slats 110 are aligned and adjacent slats 110 form a shiplap arrangement in which the top edge 161 of the core 160 of one slat 110 rests against the bottom edge 163 of a first adjacent slat and the bottom edge 163 rests against the top edge 161 of a second adjacent slat opposite the first adjacent slat. In this arrangement, the total thickness of material in an overlapping region of the joints formed between adjacent slats may be substantially equal to the thickness of the slats in their central portion. A plurality of holes 167 may extend through the central portion to receive fasteners as described below.

It will be appreciated that other overlapping features on adjacent slats may be used in the joints. For example, each slat may include a V-shaped channel at its top or bottom edge and a corresponding V-shaped protrusion at the other of its top or bottom edge. Yet other shapes are contemplated.

FIG. 4 illustrates an edge of a slat 110 using the core 160 of FIG. 3B. However, it will be appreciated that the principles described in relation to FIG. 4 are similarly applicable to a slat using the core 160 of FIG. 3A. In FIG. 4, a front covering **168*b* is disposed against or adjacent to the front side 162 of the core 160 and a rear covering 168*a* is disposed against or adjacent to the rear side 164 of the core 160. The core 160 may be formed of a first material including but not limited to fiberglass, aramid, thermoplastic, polymer, laminated glass, or carbon. One or both of the rear and front coverings 168*a*, 168*b*** may be formed of a second material which may be the same as or different than the first material. One or both of the first material or second material may comprise a fire-resistant material.

As seen in FIG. 4, the front covering **168*b* extends across and covers the central portion of the core (e.g., the portion having a full thickness) and the top portion. The rear covering 168*a* extends across and covers the central portion and the bottom portion. When in the closed configuration, the top edge of the front covering 168*b* may abut or be adjacent the bottom edge of a front covering 168*b* of an adjacent slat 110. Similarly, the bottom edge of the front covering 168*b* may abut or be adjacent the top edge of a front covering 168*b* of another adjacent slat. The rear coverings 168*a* may be similarly arranged. In this regard, when the barrier 113 is in the closed configuration, any trajectory through the barrier 113 from the front side to the rear side may intersect a front covering 168*b*, a full thickness of core material, and a rear covering 168*a* despite each individual slat having an exposed section of core 160** when viewed directly from the front or rear. This arrangement may provide enhanced resistance to projectile penetration through the barrier as compared to joints in which slats do not overlap.

Figure 4C:
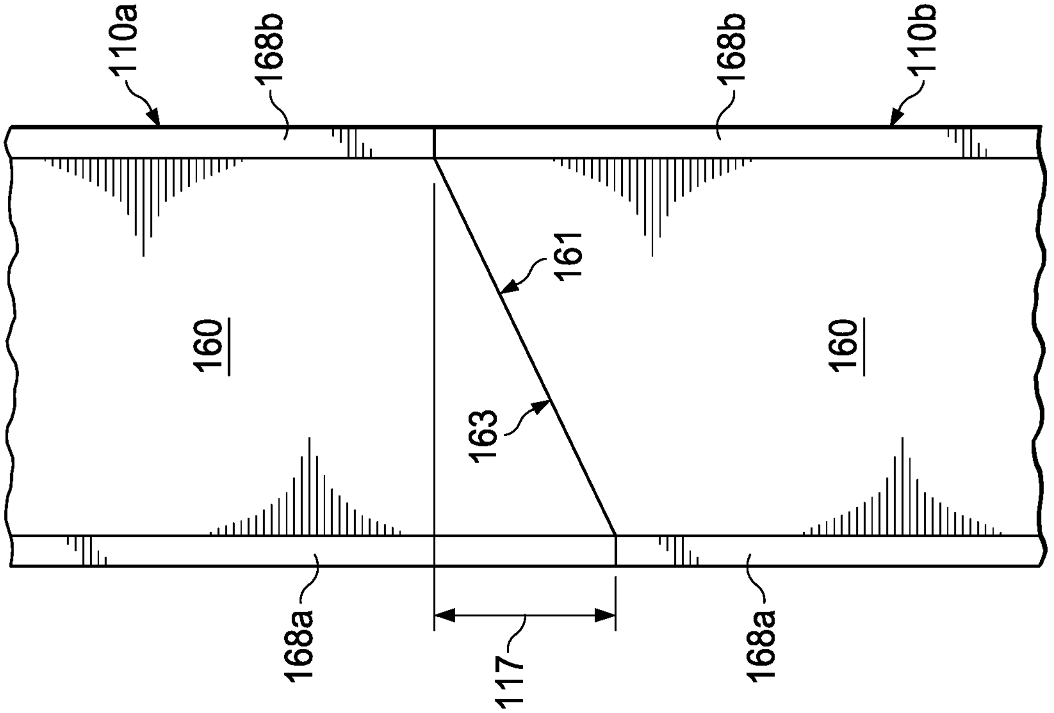
FIGS. 4B and 4C are cross-sectional views of examples of adjacent slats in a closed position forming a barrier according to the present disclosure.
Figure 4B:
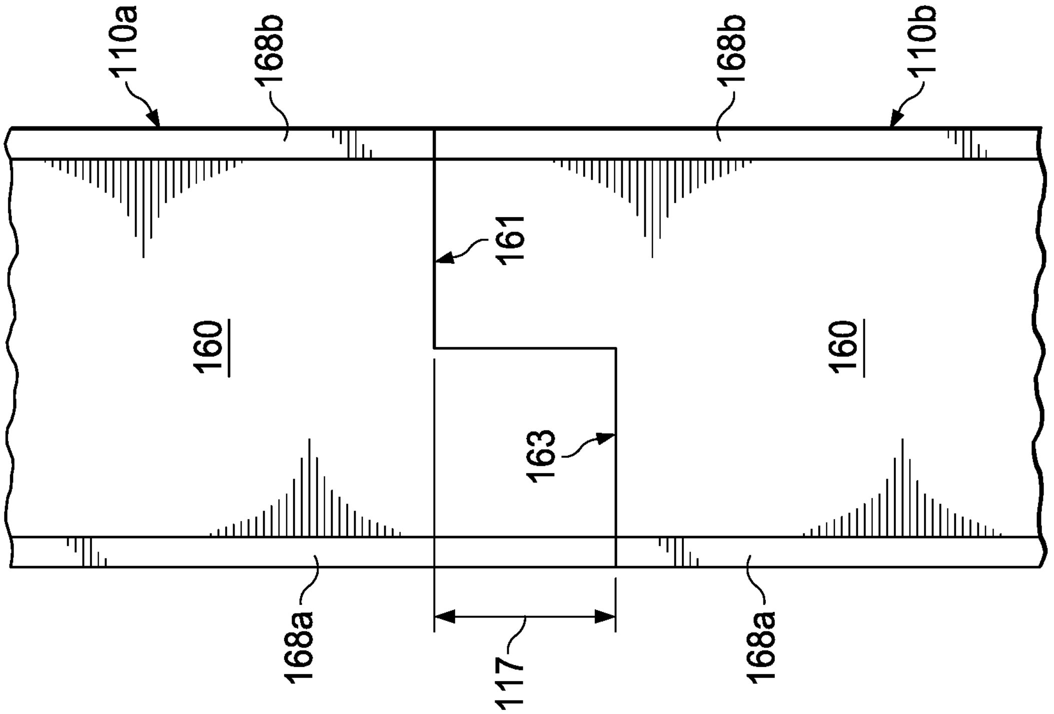

FIGS. 4B and 4C each show a joint between two adjacent slats **110*a* and 110*b*. It can be seen that the upper edge 161 of the slat 110*b* connects the front surface and the rear surface, and the lower edge 163 of the slat 110*a* connects the front surface and the rear surface. As can be seen, both the upper edge and the lower edge have a profile at least a portion of which is non-horizontal when the barrier is in a closed configuration, such that the upper edge 161 of slat 110*b* vertically overlaps the lower edge 163 of an adjacent slat 110*a* to form an overlapping region 117 when the barrier is in the closed configuration. This overlapping region 117 has a thickness (extending from the front of the barrier to the rear of the barrier) that is substantially the same as a thickness in the central portion of each slat, thereby providing enhanced resistance to projectile penetration. The profiles of the upper edge of one slat and the lower edge of another slat form a seam when the barrier is in the closed configuration. This seam may have at least a portion which is non-horizontal or non-perpendicular to a front surface of the barrier. Accordingly, the upper edge 161 and the lower edge 163 are shaped to matingly cooperate to prevent horizontal penetration through the barrier 113** by omitting a horizontal path between adjacent slats from the front surface of the barrier to the rear surface of the barrier.

In some examples, the front covering **168*b* may be configured to resist but permit penetration by a design projectile. As used herein, the term "design projectile" may refer to a projectile for which the barrier system 100 is designed to block or arrest so that the projectile striking the barrier 113 at a design velocity at a specified testing orientation (e.g., perpendicular to a front surface of the barrier) is unable to pass through the barrier 113 from the front side to the rear side. In some examples, a design projectile may be a bullet having a particular size, shape, weight, velocity, kinetic energy, material, or other specific characteristics. A slat or a joint between two slats may be configured to arrest a design projectile meaning it is constructed in a manner providing properties sufficient to prevent penetration of the design projectile. In some examples, a design projectile may be a 150 grain 7.62×51 mm (.308 caliber) lead core full metal copper jacket military ball round weighing about 9.7 grams with a velocity of 2750-3025 feet per second, more or less, at a range of 4.6 meters or other projectile falling within the standard provided by Underwriter's Laboratory Standard 752 ("UL 752") including, for example, a projectile specified for Level 8 certification. A slat or joint configured to arrest such a design projectile may be configured to withstand repeated impacts from the design projectile, such as 3 impacts or 5 impacts within a 4.5" square area, without penetration through the barrier. A joint may be configured to arrest a design projectile by including overlapping portions of adjacent slats such each joint has a thickness of one or more projectile resistant materials that is similar or substantially equal to a thickness of the one or more projectile resistant materials forming each slat. In this regard, the front covering 168***b* may be configured to slow a design projectile and/or splay the design projectile into a larger diameter as the projectile passes through the front covering 168*b*. The core 160 may be configured to arrest the design projectile which may be aided by the increased diameter caused by splaying of the projectile with the front covering 168*b*. In some instances, the front covering 168*b* and core 160 may be sufficient to completely arrest a design projectile. However, for increased fortification of the barrier 113 and to aid in preventing any shrapnel (e.g., projectile fragments, core fragments, or front covering fragments) from exiting the rear side of the barrier 113, a rear covering 168*a* may be provided on each slat 110 to trap the projectile and any such shrapnel within the slat 110. Each joint may be formed of a full thickness of a front covering 168*b* of a first slat, a partial thickness of a core 160 of the first slat, a partial thickness of a core 160 of a second slat, and a full thickness of a rear covering 168*a* of the second slat. In this regard, the joints may provide a substantially similar level of projectile resistance as the central portion of the slats that is not in an overlapping portion.

In an example, the first material comprises a woven compressed fiberglass such as of FG 800 by Insulgard® or Acculam® by Alro Plastics. In some instances, it may be desirable for the core material to satisfy Underwriters Laboratories UL 752 (Levels 1-8), National Institute of Justice (NIJ) (I, II A, II, III A, III), MIL P 46593A (ORD) V 50 test, ASTM E119 OOa (1 hour fire test), and ASTM E84 91a (Surface Burning Characteristics). Depending on the material used, the core may have a thickness of between ¼" and 3", for example ½" to 1½". In an example, the second material is steel such as AR500 or AR600 steel plating having a thickness of 1/16" to ½", such as 3/16". The first material, used in the core 160 in some examples, may be approximately ½" thick and have a specific gravity of approximately 1.81, a Rockwell hardness of approximately 117, a compressive strength greater than approximately 75,000 PSI, and an Izod impact strength rating of greater than approximately 14 ft-lbs./in. The first material, used in the core 160 in some examples, may be approximately 1.5" thick and have a specific gravity of approximately 2.07. As used in describing these characteristics of the first material, the term "approximately" may refer to greater or less than about 50% of the specified number such as greater or less than about 25% of the specified number.

As shown in FIG. 4, each slat 110 may include a roller assembly including a number of components attached at each end of the slat. Fasteners 170 (which may each include one or more bolts, nuts, and washers), extend through the holes 167 of the core 160 and holes in the respective front and rear coverings 168*a*, 168*b*. The fasteners 170 secure a bracket 169 to the slat 110. Attached to the bracket 169 are an upper mounting plate 171 and a lower mounting plate 173. As illustrated the lower mounting plate 173 supports a roller shaft 174 on which a roller 112 disposed. The roller shaft 174 may include a bearing disposed within the lower mounting plate 173 and a spacer tube extending over the shaft to maintain spacing between the roller 112 and lower mounting plate 173. The upper mounting plate 171 includes a bearing 172 through which a roller shaft 174 of an adjacent slat 110 may extend when the slats 110 are interconnected to form the barrier 113. This mated arrangement of the shaft 174 of one slat 110 with the bearing 172 of an adjacent slat forms a hinged connection. It will be appreciated that in some examples, an upper mounting plate may support the roller shaft and roller and a lower mounting plate may support a bearing to receive the roller shaft of an adjacent slat. A number of fasteners 170 may extend through the upper and lower mounting plates 171, 173 to secure them to the bracket 169.

The upper and lower mounting plates 171, 173 are formed with an angle to position the rollers 112 rearward from a centerline of the slat 110. This arrangement may place the slats 110 of the barrier 113 forward (or outward) relative to the vertical tracks 122 of the barrier system 100. In this regard, the tracks 122, rollers 112, and other components of the barrier system 100 may be offset "behind" the slats 110 to help prevent tampering and deter forced entry with tools which a perpetrator may use in an attempt to bend or break some of these components.

It will be appreciated that the bottom slat 114 and the top slat of the barrier 113 do not overlap with or hingedly connect to an adjacent slat 110 on one side. Accordingly, the configuration of the bottom and top slats may differ from the description of the slats 110 provided herein. For example, the bottom slat 114 may have a unique mounting plate to position a roller above the bottom edge. The bottom edge may also be flat rather than tapered to overlap an adjacent slat. Similarly, the top slat may omit the upper mounting plate or have a unique mounting plate to position a roller below the top edge, which may be flat rather than tapered. In some examples, the bottom slat 114 may be constructed of primarily of steel, omitting the core material altogether and using a greater thickness of steel than in the front covering 168*a* and rear covering 168*b* described herein.

Figure 5:
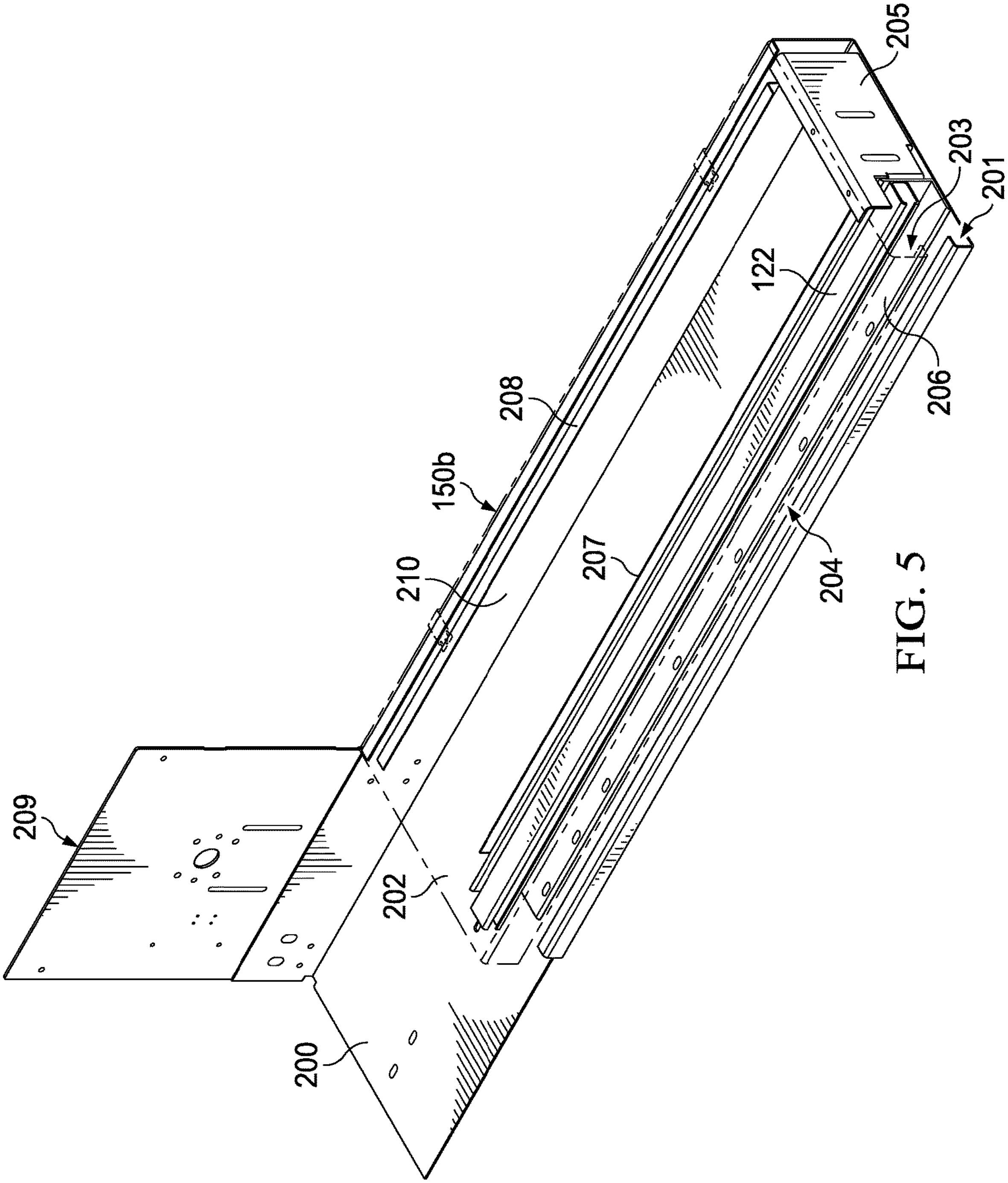
FIG. 5 is a perspective view of an example of a side column according to the present disclosure, which may be used in the system of FIG. 1A.

Turning now to FIG. 5, a side column 150*b* of the barrier system 100 is illustrated. The opposing side column 150*a* of FIG. 1A is not separately illustrated but generally resembles side column 150*b* with features being mirrored. The side column 150*b* houses the vertical track 122 and provides overall structural support for the barrier system 100. In particular, the side column 150*b* includes a front panel 200, a rear panel 202, and a side panel 210 extending between the front and rear panels. The panels 200, 202, and 210 may be constructed from the same material as the front or rear coverings of the slats. In one example, the panels are formed from ¼" thick steel. In some examples, the front rear and side panels are formed by bending a single metal plate. In the illustrated example, the panels are formed separately and secured together with a plurality of brackets and fasteners. A bottom plate 205 may be secured to one or more of the front, side, and rear panels and includes fixture holes for fastening the side column 150*b* to the ground. The panels and the bottom plate 205 may be welded together or be separately attachable with fasteners. A mounting plate 209 is positioned near the top of the side column 150*b* and is configured to support various components of the drive system 102, the counterbalancing system 130, the drive shaft 115, etc. The mounting plate 209 may be formed as part of the side panel 210 or may be manufactured separately and fastened or welded to the side panel 210.

The vertical track 122 may be formed by two bent metal plates affixed together by removable fasteners or may be formed by bending a single plate. A bracket 206 is secured to the front panel 200 and the track 122 is attached to the bracket 206 to position the track 122 at proper location for alignment with the rollers 112.

The front panel 200 and the rear panel 202 may each have an edge formed into a C-channel 201, 203, respectively. A space between the C-channels 201, 203 forms a slot 204 extending along a substantial height of the side column 150*b*. This slot may be sized and positioned to receive the slats 110 and the barrier 113. A width of the slot 204 may correspond to a thickness of the barrier 113. By sizing the slot 204 and positioning the barrier 113 within the slot appropriately, there may be only a minimal gap (e.g., 1/16" or 1/4") formed between the front surface of the barrier 113 and the front panel 200. Such a small gap may help prevent forced entry by providing insufficient space to insert tools into the side column 150*b*.

A guide tongue 207 may be positioned on the front panel 200 and a guide tongue 208 may be positioned on the side panel 210. These guide tongues extend linearly up and down the side column 150*b* to guide the counterbalance weight as described below.

Figure 6:
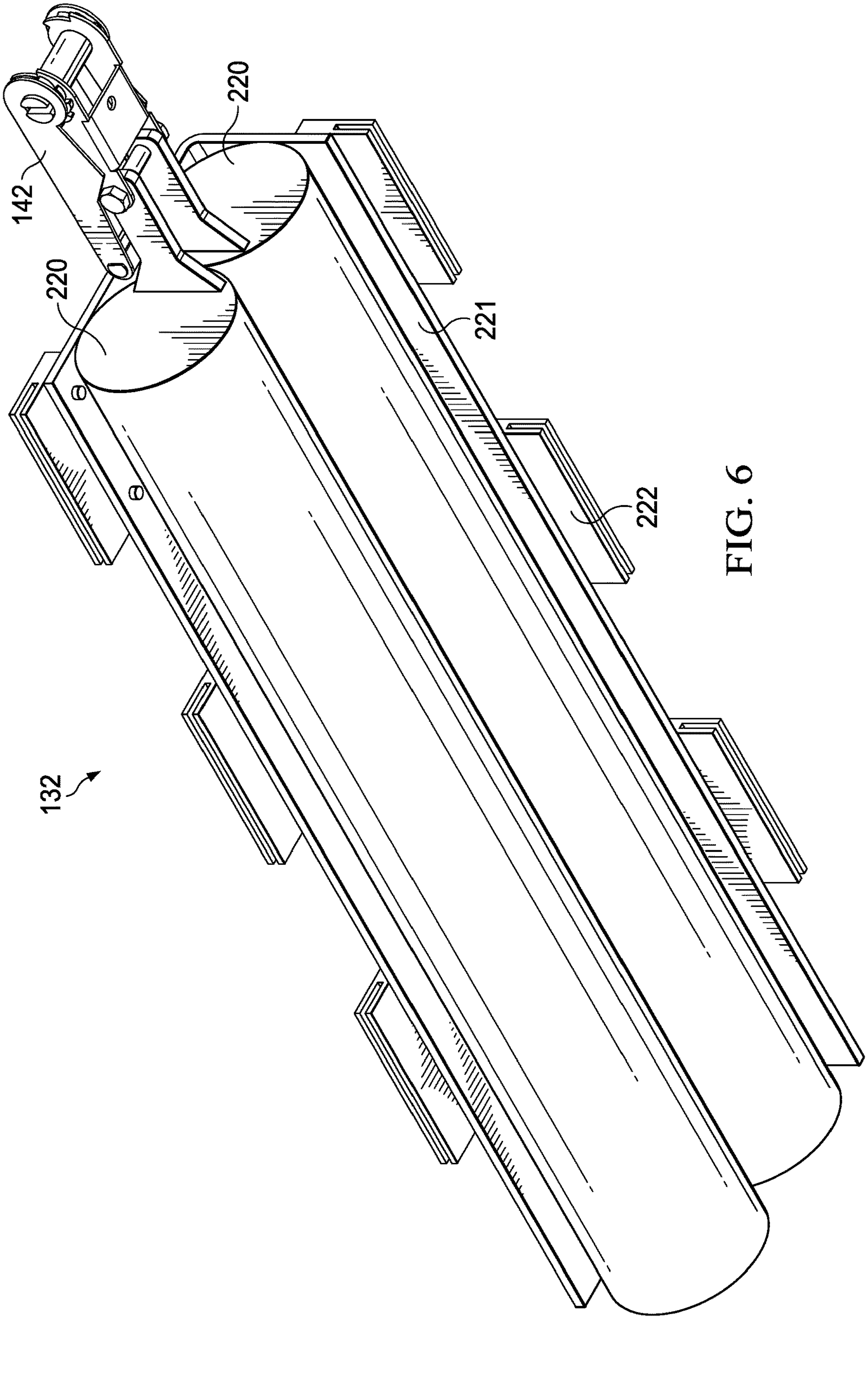
FIG. 6 is a perspective view of an example of a counterbalance weight according to the present disclosure which may be used in the system of FIG. 1A.

FIG. 6 illustrates an example of a counterbalance weight 132 as used in the barrier system 100 of FIG. 1A. The counterbalance weight 132 is formed of two weight cylinders 220 secured to a counterbalance panel 221. More or fewer weight cylinders 220 or larger or smaller sizes may be used dependent upon the weight of the barrier 113, which is generally greater than similarly sized conventional barriers due to its fortified construction. A ratchet mechanism 142 is secured to the top of the weight cylinders 220 and may be used to adjust a length of counterbalance belt 135 extending between the counterbalance weight 132 and drive shaft 115. A plurality of guide plates 222 extend from edges of the counterbalance panel 221. Each of the guide plates include a slot sized and positioned to receive the guide tongues 207 and 208 extending from the front panel 200 and side panel 210 of a respective support column 150. The engagement of the guide plates 222 with the guide tongues 207 and 208 helps guide the counterbalance weight 132 vertically and prevent it from swinging within the side column 150.

Figure 7:
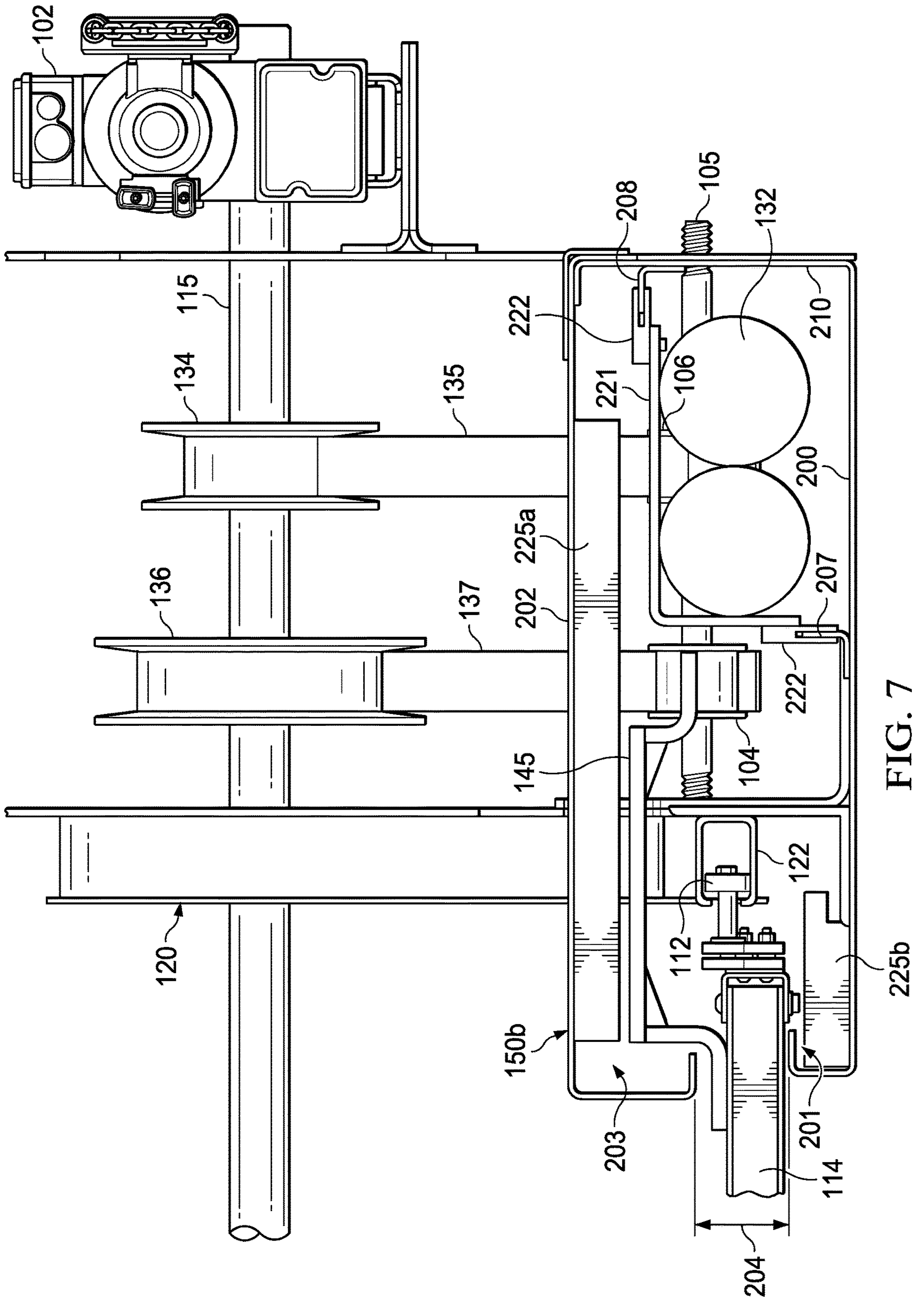
FIG. 7 is a partial bottom view showing an example arrangement of elements in a side column of the system of FIG. 1A.

FIG. 7 provides a bottom view of a portion of the barrier system 100 including the side column 150*b*. This illustration provides an example spatial arrangement of various components discussed above and the description of these components is not repeated here. However, in addition to the above-described components, FIG. 7 also illustrates a plurality of protective panels 225 which may be disposed within the side columns 150. A first protective panel 225*a* extends horizontally across a large portion of the rear panel 202 and may extend vertically from ground level up to frame 107. Protective panel 225*a* may be sized and positioned to arrest a projectile or debris generated from a projectile that may pierce the front panel 200 and strike components within the side column 150*b*. Protective panel 225*b* is secured to the front panel 200 and may be positioned to arrest or slow a projectile that pierces front panel 200 to prevent it from damaging the roller assemblies which may negatively effect operation of the barrier. The protective panels 225*a*, 225*b* may be constructed from any suitable material. In some examples, the protective panels are constructed of the same material as the core 160 of the slats 110, such as woven compressed fiberglass. It will be appreciated that more or fewer protective panels of greater or lesser size may be positioned within the side column 150*b* as appropriate for a particular application.

Although the figures show relative positions of each component, the actual dimension and scale of each component may differ from the illustration and depend on different production specifications.

Additional components may be used in the barrier system 100 which are not illustrated or described with specificity to avoid obfuscating the present disclosure. These additional components include but are not limited to tensioners, sensors, controllers, user interfaces, etc. For further description of such components, see U.S. Pat. App. Pub. No. 2019/0071923.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "outer" and "inner," "upper" and "lower," "first" and "second," "internal" and "external," "above," and "below" and the like are used as words of convenience to provide reference points and are not to be construed as limiting terms.

In addition, the foregoing describes only some embodiments of the invention(s), and alterations, modifications, additions and/or changes can be made thereto without departing from the scope and spirit of the disclosed embodiments, the embodiments being illustrative and not restrictive.

Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

Persons of ordinary skill in the art will appreciate that the implementations encompassed by the present disclosure are not limited to the particular exemplary implementations described above. In that regard, although illustrative implementations have been shown and described, a wide range of modification, change, combination, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. A barrier system, comprising:

a roll-up barrier comprising a plurality of slats hingedly connected, wherein each slat of the plurality of slats includes a central portion having a first material thickness, a top portion, and a bottom portion, at least one of the top portion or the bottom portion having a second thickness less than the first material thickness, wherein the top portion of each slat overlaps the bottom portion of an adjacent slat forming an overlapping region having the first material thickness when the barrier is in a closed configuration;

a guide system configured to guide movement of the roll-up barrier; and a drive system configured to transition the roll-up barrier between open and closed configurations along the guide system.

2. The barrier system of claim 1, wherein the other of the top portion or the bottom portion having a profile that mates with a profile of said at least one of the top portion and the bottom portion having the second thickness.

3. The barrier system of claim 1, wherein the roll-up barrier further comprises a plurality of roller assemblies, each roller assembly secured to one of the plurality of slats.

4. The barrier system of claim 3, wherein the guide system comprises opposing tracks configured to receive a plurality of rollers of the plurality of roller assemblies to guide the slats as the barrier transitions between the closed configuration and an open configuration.

5. The barrier system of claim 4, wherein the guide system further comprises a spiral bracket secured to each opposing track, each spiral bracket configured to guide the plurality of slats into a spiral formation when in the open configuration.

6. The barrier system of claim 4, further comprising side columns shrouding at least a portion of the plurality of roller assemblies and the tracks.

7. The barrier system of claim 6, wherein each side column forms a slot configured to receive an end portion of each slat of the plurality of slats, wherein a front side of each slat is positioned within 0.25 inches of a surface of each side column forming the slot.

8. The barrier system of claim 6, wherein the side columns are formed of a first material configured to splay a projectile, the barrier system further comprising at least one protective panel disposed within at least one of the side columns, the at least one protective panel formed of a second material configured to arrest a projectile.

9. The barrier system of claim 8, wherein the first material comprises steel and the second material comprises at least one of fiberglass, aramid, or carbon.

10. A slat for a roll-up barrier, comprising:

a core formed of a woven material configured to arrest a projectile, the core being about ½ inches to 3 inches thick; and a front covering formed of a second material different than the woven material and configured to splay the projectile.

11. The slat of claim 10, further comprising a rear covering formed of a third material configured to trap debris within the core.

12. The slat of claim 11, wherein the third material is the same as the second material.

13. The slat of claim 12, wherein the second material and the third material comprise steel.

14. The slat of claim 10, wherein the first woven material comprises woven compressed fiberglass.

15. The slat of claim 10, wherein a top edge of the slat is angled with respect to a front surface of the slat in a first direction and wherein a bottom edge of the slat is angled with respect to the front surface in the first direction.

16. The slat of claim 10, wherein a top edge of the slat includes a rabbet formed into a front surface or a rear surface of the slat and a bottom edge of the slat includes a rabbet formed into the other of the front surface or the rear surface.

17. A barrier, comprising:

a plurality of slats hingedly connected, wherein each slat includes a central portion having a first material thickness, a top portion having a second thickness less than the first material thickness, and a bottom portion having a third thickness less than the first material thickness, wherein the top portion of each slat overlaps the bottom portion of an adjacent slat forming an overlapping region having the first material thickness when the barrier is in a closed configuration.

18. The barrier of claim 17, wherein each slat comprises a core formed of a first material configured to arrest a projectile and a front covering formed of a second material different than the first material and configured to splay the projectile, wherein the front covering extends across the central portion and one of the top portion or the bottom portion.

19. The barrier of claim 18, wherein each slat comprises a rear covering formed of the second material, wherein the rear covering extends across the central portion and the other of the top portion or the bottom portion.

20. The barrier of claim 17, wherein the top portion of each slat includes a surface angled relative to a front surface of the slat in a first direction and a bottom surface angled relative to the front surface in the first direction.

21. The barrier of claim 17, wherein the top portion of each slat includes a rabbet formed into a front surface or a rear surface and the bottom portion of each slat includes a rabbet formed into the other of the front surface or the rear surface.

22. A barrier system, comprising:

a roll-up barrier comprising a plurality of adjacent slats, each slat of the plurality of slats having a first material thickness and comprising a front surface, a rear surface, an upper edge connecting the front surface and the rear surface, and a lower edge connecting the front surface and the rear surface, at least a portion of both the upper edge and the lower edge having a non-horizontal profile when the barrier is in a closed configuration, such that the upper edge of each slat vertically overlaps the lower edge of an adjacent slat to form an overlapping region having the first material thickness when the barrier is in the closed configuration;

a guide system configured to guide movement of the roll-up barrier; and a drive system configured to transition the roll-up barrier between open and closed configurations along the guide system.

23. The barrier system of claim 22, wherein the non-horizontal profile of the upper edge shaped to matingly engage with the non-horizontal profile of the lower edge.

24. A roll-up barrier, comprising:

a plurality of slats hingedly connected together and forming joints between adjacent slats, the roll-up barrier having a closed configuration in which the plurality of slats collectively form an upright panel and an open configuration in which the plurality of slats assume a rolled formation, wherein the joints are configured to arrest, in a closed configuration of the barrier, a projectile meeting the criteria of UL 752 Level 8.

25. The roll-up barrier of claim 24, wherein each joint comprises a vertically overlapping region including a top portion of a first slat and a bottom portion of a second slat.

26. The roll-up barrier of claim 25, wherein a vertically central region of each slat of the plurality of slats comprises one or more projectile resistant materials and each joint comprises the one or more projectile resistant materials in substantially equal proportion to the vertically centrally region of each slat.

27. The roll-up barrier of claim 24, wherein each joint includes a seam extending from a front surface of the barrier to a rear surface of the barrier, at least a portion of the seam being non-perpendicular to the front surface of the barrier.

* * * * *